(12) United States Patent
Gupta

(10) Patent No.: US 9,355,394 B2
(45) Date of Patent: May 31, 2016

(54) SYSTEMS AND METHODS OF AGGREGATING SPLIT PAYMENTS USING A SETTLEMENT ECOSYSTEM

(75) Inventor: Rajiv Gupta, Cupertino, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

(21) Appl. No.: 13/572,535

(22) Filed: Aug. 10, 2012

(65) Prior Publication Data

US 2013/0041824 A1    Feb. 14, 2013

Related U.S. Application Data

(60) Provisional application No. 61/522,487, filed on Aug. 11, 2011.

(51) Int. Cl.
  *G06Q 40/00* (2012.01)
  *G06Q 20/14* (2012.01)

(52) U.S. Cl.
  CPC .............. *G06Q 20/14* (2013.01); *G06Q 40/00* (2013.01)

(58) Field of Classification Search
  CPC ....... G06Q 10/00; G06Q 20/00; G06Q 30/00; G06Q 40/00
  USPC ...................................................... 705/3–44
  See application file for complete search history.

(56) References Cited

U.S. PATENT DOCUMENTS

| | | | |
|---|---|---|---|
| 5,155,342 A | 10/1992 | Urano | |
| 6,035,281 A | 3/2000 | Crosskey et al. | |
| 6,336,096 B1 | 1/2002 | Jernberg | |
| 7,725,390 B2 | 5/2010 | Plant | |
| 7,949,580 B1 | 5/2011 | Boyer et al. | |
| 7,958,052 B2 | 6/2011 | Powell | |
| 8,239,275 B1* | 8/2012 | Lyren et al. ................... | 705/26.1 |
| 2002/0107792 A1 | 8/2002 | Anderson | |
| 2009/0083179 A1 | 3/2009 | Gustave et al. | |
| 2009/0157519 A1 | 6/2009 | Bishop et al. | |
| 2010/0010906 A1 | 1/2010 | Grecia | |
| 2010/0191645 A1 | 7/2010 | Hougland et al. | |
| 2010/0274680 A1* | 10/2010 | Carlson et al. ................... | 705/26 |
| 2011/0106668 A1 | 5/2011 | Korosec et al. | |
| 2011/0137803 A1* | 6/2011 | Willins ........................... | 705/67 |
| 2012/0022969 A1* | 1/2012 | Collas et al. ................ | 705/26.41 |

FOREIGN PATENT DOCUMENTS

WO   2007/127090 A2   11/2007

OTHER PUBLICATIONS

International Search Report and Written Opinion of the International Searching Authority mailed on Jan. 31, 2013 for PCT Patent Application No. PCT/US2012/050654, 8 pages.
International Preliminary Report on Patentability for PCT Application No. PCT/US2012/050654 issued Feb. 11, 2014, 4 pages.

* cited by examiner

*Primary Examiner* — Frantzy Poinvil
(74) *Attorney, Agent, or Firm* — Kilpatrick Townsend & Stockton LLP

(57) ABSTRACT

Systems, apparatuses and methods for enabling a group of people to share the cost of an event, such as a meal, the purchase of a gift, or the rental of a car. Embodiments of the invention provide the tools needed to enable a group to participate in a shared event or activity, where one of the participants pays for the event or activity using their payment device and the other members of the group pay their portion of the cost to the participant who made the payment. Embodiments of the invention provide an ecosystem where a person can pay for an event, goods, or services using a single payment device (such as a credit or debit card) and then settle the amounts owed to them by other members of a group using the tools provided by the invention.

27 Claims, 16 Drawing Sheets

FIG. 3

View Events

Time range
- Last 7 days
- Last 30 days
- Last 60 days
- Between [ ] and [ ]

Status
- Currently Open ▶
- Closed
- All

Search
- Merchant
- Amount
- Date
- Time
- Txn ID

| Event ID | Transaction ID | Merchant | Amount | Date | Time | Status | Number of Participants | Amount Settled | Amount Pending | List of Participants |
|---|---|---|---|---|---|---|---|---|---|---|
| E1 | 5VUB23XYU | Wolfgang | $723 | 5/2/2012 | 9:20 pm | Open | 6 | $0 | $650 | Tracy, James, Ben, Sally, Grace, me |
| E2 | 4GUL64YYJ | AMT Movie Theatres | $48 | 5/3/2012 | 7:00 pm | Open | 4 | $0 | $48 | Lydia, Chase, Simon, me |

FIG. 5

Hello <Participant>,

Thank you for participating in the following event.

Event Name     <Event Name>
Event Location <Event Location>
Date/Time      <Date/Time>

The total bill paid for this event was <Total bill amount>. The bill payer, <Payer>, has requested you to pay your portion of the bill, which is <Participant's portion>.

If you are signed up for the <Online Pay Service> you can click the following link to make the payment.

<Link to Online Pay Service with data about this event>

If you would like to join the <Online Pay Service> please click here

<Link to Online Pay Service>

If you have already paid your portion offline or through other systems, please click the following link so that it can be updated in the system.

<Link to 'Settled Offline' by this participant for this event>

Thank you,
<VShare Team>

Hello <Payer>,

Good news! You have just received a payment of <Participant's portion> sent by <Participant> for the following event.

Event Name      <Event Name>
Event Location  <Event Location>
Date/Time       <Date/Time>

The remaining balance for this event is <Remaining Balance>

You can check more details about this event on <Event Details Page>

Thank you,
<VShare Team>

Username
Password

Not a user? Register

Basic info

Select a username
Create a password
Reenter password

Name
Address 1
Address 2
City
State
ZIP

Phone Number
Email ID

SYSTEMS AND METHODS OF AGGREGATING SPLIT PAYMENTS USING A SETTLEMENT ECOSYSTEM

CROSS-REFERENCES TO RELATED APPLICATIONS

This application claims priority to and the benefit of U.S. Provisional Patent Application Ser. No. 61/522,487, filed on Aug. 11, 2011, and entitled "Systems and Method of Aggregating Split Payments Using a Settlement Eco System," the entire disclosure of which is herein incorporated by reference for all purposes.

BACKGROUND

Aspects of the disclosure relate to computer software, computing devices, and computing technology. In particular, some aspects of the disclosure relate to computer software, computing devices, and computing technology for aggregating split payments using a settlement ecosystem.

Conventionally, when a group of people participate in an event, a service, or a purchase of a product, a retailer or a merchant provides a single bill to the group of people and expects the group of people to figure out how to settle their share of the bill. Oftentimes, a person within the group pays for the total bill with his or her payment device (e.g., a credit card, a debit card) and seeks repayment from others within the group. As different people may owe different amounts to the payer and may repay the payer using different payment methods, it may be difficult for the payer to keep track of payments owed by different people in the group.

Various embodiments of the invention address these and other issues, individually and collectively.

BRIEF SUMMARY

Certain embodiments relate to managing and settling an aggregated financial transaction for a transaction event. In some embodiments, a collaboration application can provide a set of tools that allows a user to manage and track payments owed by participants of a group event (e.g., a meal, the purchase of a gift, the rental of a car). For example, the user (also referred to as a payer) may pay for a transaction cost associated with the group event using a payment device. After the user has paid for the transaction cost that covers the cost of one or more other participants in the group event, the collaboration application can track one or more transactions associated with the event and allow the user to manage payments owed by the other participants. In some embodiments, the collaboration application may generate and send a set of notification messages to the other participants to inform the other participants of an amount owed to the payer. Further, the collaboration application may facilitate a transfer of funds from the participants to the payer in some embodiments.

Certain embodiments provide a method that receives, by a computing device, transaction data for a transaction event associated with at least a first participant and a second participant, the transaction data including a transaction value paid for by the first participant. In some embodiments, the method receives identification data identifying the second participant. The method determines, based at least in part on the transaction data, a portion of the transaction value associated with the second participant, the portion of the transaction value being less than the full transaction value. The method causes a notification to be generated and sent to the second participant, the notification including the portion of the transaction value.

Further, certain embodiments provide a computing device that includes at least one processor and a computer readable medium coupled to the processor. The computer readable medium includes code executable by the one or more processor for implementing a method that receives transaction data for a transaction event associated with at least a first participant and a second participant, the transaction data including a transaction value paid for by the first participant. The method further receives identification data identifying the second participant. The method determines, based at least in part on the transaction data, a portion of the transaction value associated with the second participant, the portion of the transaction value being less than the full transaction value. The method causes a notification to be generated and sent to the second participant, the notification including the portion of the transaction value.

Further, certain embodiments provide a method that receives, by a computing device, transaction data for a transaction event associated with a plurality of participants, the transaction data including a transaction value paid for by a first participant. The method receives apportionment data associated with a second participant in the plurality of participants, wherein a portion of the transaction value associated with the second participant is computed based on the apportionment data. The method causes a notification to be generated and sent to the second participant, the notification including the portion of the transaction value.

Further, certain embodiments provide a computing device that includes at least one processor and a computer readable medium coupled to the processor. The computer readable medium includes code executable by the one or more processor for implementing a method that receives, by a computing device, transaction data for a transaction event associated with a plurality of participants, the transaction data including a transaction value paid for by a first participant. The method receives apportionment data associated with a second participant in the plurality of participants, wherein a portion of the transaction value associated with the second participant is computed based on the apportionment data. The method causes a notification to be generated and sent to the second participant, the notification including the portion of the transaction value.

The following detailed description together with the accompanying drawings will provide a better understanding of the nature and advantages of the present invention.

BRIEF DESCRIPTION OF THE DRAWINGS

FIG. 3 depicts a user interface display that allows the user to identify a transaction associated with an event in accordance with some embodiments of the invention.

FIG. 5 depicts a user interface display that can be presented to a participant to notify the participant of his or her participation in the shared event, details of the event, the amount he or she owes the payer, and information regarding one or more payment methods that may be used by the participant in accordance with some embodiments of the invention.

FIG. 6 depicts a user interface display that may be presented to the payer to notify the payer that a participant has settled a portion of the cost of the shared event in accordance with some embodiments of the invention.

FIG. 8 depicts a user interface display that allows the user to create a new user account with the collaboration service in accordance with some embodiments of the invention.

DETAILED DESCRIPTION

Figure 1:
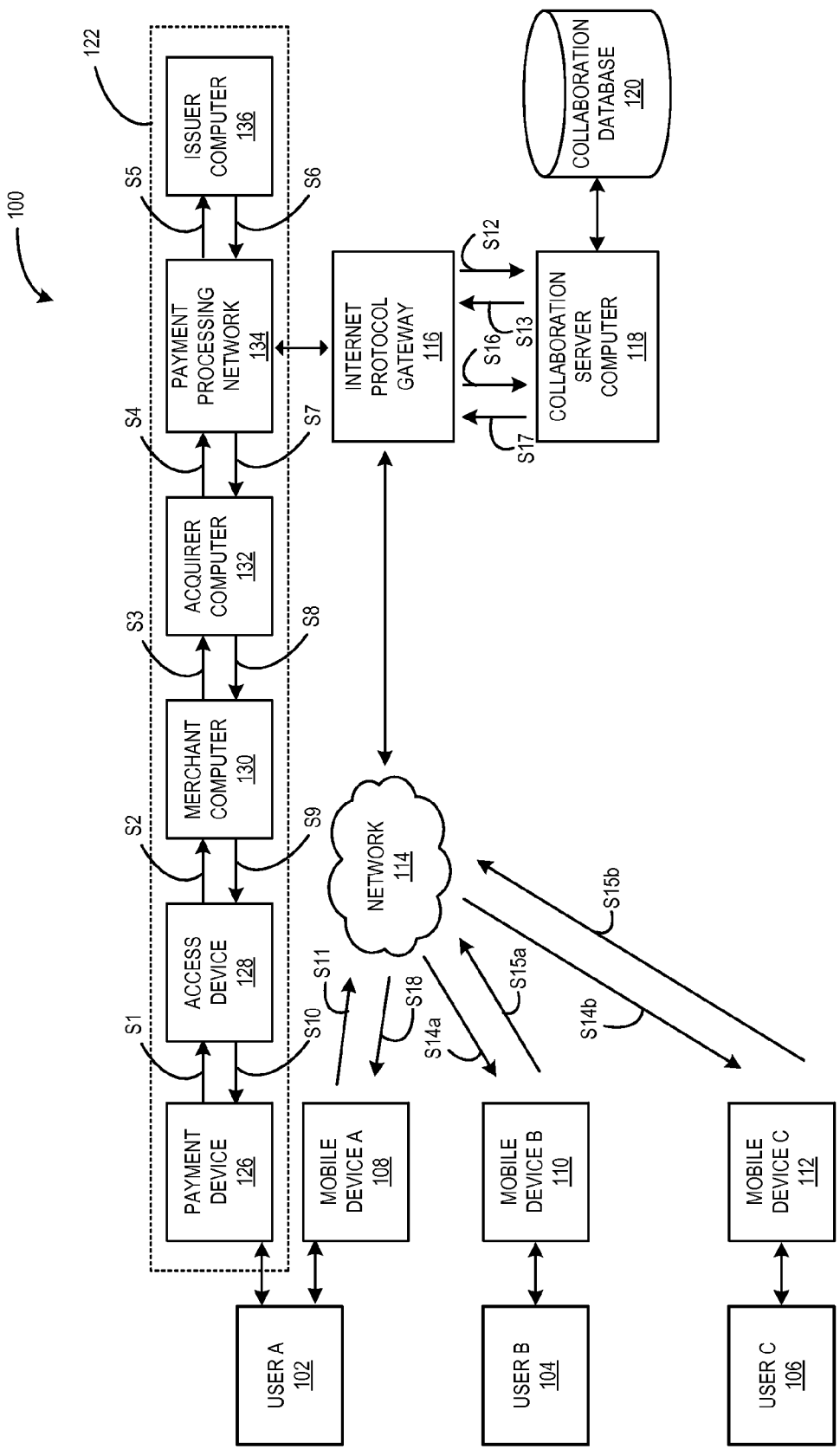
FIG. 1 illustrates a simplified diagram of a system that may incorporate one or more embodiments of the invention.

In the following description, numerous details, examples and embodiments are set forth for the purposes of explanation. However, one of ordinary skill in the art will recognize that the invention is not limited to the embodiments set forth and that the invention may be practiced without some of the specific details discussed. Further, some of the examples and embodiments, including well-known structures and devices, are shown in block diagram form in order not to obscure the description with unnecessary detail.

Certain embodiments are directed to enabling a group of people to share the cost of an event, such as a meal, a gift purchase, a car rental, etc. In one example, a person at a group lunch can pay for the meal using a single credit card or debit card and other members can pay the person who paid for the group lunch their portions of the cost using their own payment accounts or cash. Some embodiments can notify the members of the group of the amounts each owe from a transaction, track payments made by the members of the group to the person who paid for the shared event, generate reminder messages regarding the transaction and the amounts owed to the members of the group, and for members of the group to construct a profile that may include information regarding which of their payment accounts they desire to use for their portion of the amount owed.

Prior to discussing various embodiments and arrangements in greater detail, several terms will be described to provide a better understanding of this disclosure.

As used herein, a "transaction" may include a purchase of goods and/or services, a withdrawal of funds, an electronic transfer of funds, or any other transaction involving an account associated with a consumer. A transaction can occur at a merchant location (e.g., at the point of sale), at an automated teller machine (ATM), on the Internet, by phone, by mail, or in any other suitable context in which the transaction can be processed electronically.

As used herein, an "event" or a "transaction event" or a "shared event" may include one or more actions or transactions, such as the purchase of goods and/or services, by a collection of people. For example, an event may be a baseball game, a movie outing, a dinner event, a purchase of a gift, a rental of a car, boat, property, etc. Oftentimes, a group of people may participate in an event or a transaction event where a total cost of the event is provided upon conclusion of the event and the cost of the event is intended to be shared among the participants. For example, a group of friends may rent a car where each person intends to contribute a portion of the cost upon receiving the bill.

As used herein, "event data" may include information identifying an event (or one or more transactions associated with the event). For example, event data can include a cost or "transaction value" associated with the event, a unique transaction identifier, transaction date and time, account number, transaction class code (e.g., credit, debit, ATM, prepaid, etc.), merchant code (e.g., MVV, DBA, etc.), ATM code, acquirer code, acquirer processor code, issuer code (e.g., BIN, etc.), issuer processor code, authorization category code (e.g., approved, declined, rejected, etc.), one or more error codes, transaction amount (e.g., settlement amount), cardholder or account holder information (e.g., name, date of birth, address, phone number, etc.), card verification value (CVV), expiration date, loyalty account information, and other information relating to the event or the transaction event. The "transaction value" or "transaction cost" may include a cost amount of goods and/or services associated with one or more transactions.

As used herein, "transaction data" may include any information corresponding to or describing a financial transaction, a purchase, an order, an invoice, a payment involving goods and/or services. Examples may include, but are not limited to, a transaction amount/value/cost, a merchant identifier for a merchant associated with the transaction, the volume of the transaction, information about the goods or services being purchased including a description code (e.g., North American Industry Classification System) associated with purchased items and a description, the merchant location, a purchase date, an indication of the payment accounts used, an indication, and any other information that is related to the current transaction.

As used herein, "identification data" may include information identifying participants of an event or shared group event. For example, identification data can include names of the participants, account identifiers or usernames of the participants in a collaboration service (or in other services such as a social networking service), etc.

As used herein, a "notification" may include a message that can be sent to a participant to provide information to the participant, such as an amount that the participant may owe the payer from an event. The notification may include additional information about the event such as a time, date, a description of the event, participants of the event, etc. In some embodiments, a notification or notification message can serve as a reminder that the participant owes or still owes the payer a certain amount of the transaction cost.

As used herein, "apportionment data" may include an allocation method for the transaction cost across the participants in the event. One or more participants in an event may provide apportionment data such that a computing device (e.g., a mobile device or a server) can compute a portion of the transaction cost owed by each of the participants. For instance, a payer or a participant may indicate that the apportionment method to be an even split such that each participant is responsible for an evenly divided amount of the cost of the event.

A "mobile device" as used herein may include any device that is capable of being transported and operated by a user. As discussed below, a mobile device may run a collaboration application and present a user interface to facilitate tracking, management, and settlement of funds owed to or owed by other members within a shared event. Examples of mobile devices include smart phones, tablet computer, laptop computers, personal digital assistants, and/or other mobile computing devices.

As used herein, a "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to one or more databases and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

As used herein, a "payment account" (which may be associated with one or more payment devices) may include any suitable payment account including a credit card account, a checking account, or a prepaid account.

As used herein, a "payment device" may include any device that may be used to conduct a financial transaction, such as to provide payment information to a merchant. A payment device may be a portable consumer device that is compact such that it can fit into a consumer's wallet and/or pocket (e.g., pocket-sized). The payment device may include a processor, and memory, input devices, and output devices, operatively coupled to the processor. Examples of payment devices may include smart cards, magnetic stripe cards, keychain devices (such as the Speedpass™ commercially available from Exxon-Mobil Corp.), etc. Other examples of payment devices include cellular phones, personal digital assistants (PDAs), pagers, payment cards, security cards, access cards, smart media, transponders, 2-D barcodes, an electronic or digital wallet, and the like. If the payment device is in the form of a debit, credit, or smartcard, the payment device may also optionally have features such as magnetic stripes. Such devices can operate in either a contact or contactless mode.

As used herein, a "payment processing entity" may include a merchant, an acquirer, an acquirer computer, an issuer, an issuer computer, a payment processing network, or any other entity that participates in the processing of electronic payment transactions.

As used herein, a "merchant" may include an entity that engages in transactions and can sell goods or services, and as used herein may also include an ATM.

An "acquirer" may include a business entity (e.g., a commercial bank) that has a business relationship with a particular merchant or other entity.

As used herein, an "issuer" may include a business entity (e.g., a bank) that maintains financial accounts for consumers such as individuals, businesses, and other entities, and that may issue portable consumer devices such as credit and debit cards to consumers. Some entities may perform both issuer and acquirer functions. Embodiments of the invention encompass such single entity issuer-acquirers.

As used herein, a "payment processing network" may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transaction, and other types of commercial transactions. VisaNet™, in particular, includes a VIP system (Visa Integrated Payments system) which processes authorization requests and a Base II system which performs clearing and settlement services.

As used herein, an "acquirer computer" may include an entity that processes electronic payment transactions on behalf of an acquirer, or that cooperates with an acquirer to process electronic payment transactions.

As used herein, an "issuer computer" may include an entity that that processes electronic payment transactions on behalf of an issuer, or that cooperates with an issuer to process electronic payment transactions. An issuer computer may include data processing subsystems, networks, and operations used to support and deliver various services such as network gateway, risk management, program management, authorization, exception file, and clearing and settlement services. An exemplary issuer processor may include Visa DPS™.

As used herein, an "authorization request message" may include a data message, or sequence of data messages, that requests an issuer of a payment account to authorize a transaction. An authorization request message according to an embodiment of the invention may comply with International Organization for Standardization (ISO) 8583, which is a standard for systems that exchange electronic transactions made by cardholders using payment cards. An authorization request message according to other embodiments may comply with other suitable standards.

As used herein, an "authorization response message" may include a data message, or sequence of data messages, that responds to a merchant's and/or acquirer's request to authorize a transaction. An authorization response message according to an embodiment of the invention may comply with ISO 8583, which, as described above, is a standard for systems that exchange electronic transactions made by cardholders using payment cards. An authorization response message according to other embodiments may comply with other suitable standards.

In some embodiments, a participant or a payer of a group event may perform a purchase transaction that covers a cost of the group event using a payment device of the participant. Some embodiments provide a collaboration system where the payer may access a collaboration service (e.g., through a collaboration application executing locally on a user's computing device or a collaboration application executing remotely on a server, such as software as a service (SaaS) hosted on the cloud) to track and manage payments owed by other participants in the group event. Other participants of the group event may also use the collaboration service to settle their portion of the cost with the payer.

FIG. 1 illustrates an example of a collaboration system 100 that may incorporate one or more embodiments of the invention. Collaboration system 100 may include a first user 102, a second user 104, a third user 106, a first mobile device 108, a second mobile device 110, a third mobile device 112, a network 114, an internet protocol gateway 116, a collaboration server computer 118, a collaboration database 120, and a payment processing subsystem 122. Payment processing subsystem 122 may include a payment device 126, an access device 128, a merchant computer 130, an acquirer computer 132, a payment processing network 134, and an issuer computer 136. Payment processing subsystem 122 may also include an acquirer processor and/or an issuer processor (not shown).

First user 102, second user 104, and third user 106, or also referred to as participants of an event, may each be an individual or an organization (e.g., a business) that is capable of purchasing goods or services. First user 102 may have access to payment device 126 such that first user 102 may conduct a financial transaction or pay for the cost of an event using payment device 126. First user 102, second user 104, and third user 106 each have access to a computing device such as mobile devices 108, 110, and 112, respectively. While this example describes the participants accessing a collaboration service using mobile devices, some embodiments allow the participants to access the collaboration service using other types of computing devices such as a laptop, a desktop, a tablet computer, etc.

In some embodiments, a collaboration service provides tools that allow a user to track, manage, and settle payments owed by other participants of an event. As shown in FIG. 1, collaboration system 100 includes a collaboration server computer 118 that can provide the collaboration service. Collaboration server computer 118 may be accessible to the user via network 114 (either directly connected or indirectly through an Internet Protocol Gateway (IPG) 116 and may also be in operational communication with payment processing network 134. In certain embodiments, collaboration server computer 118 may be a part of payment processing network 134.

Collaboration server computer 118 in some embodiments can include a processor (not shown) and a computer readable medium (not shown) storing code, which when executed, causes the processor to implement a method that receives transaction data for a transaction event associated with at least a first participant (e.g., user 102) and a second participant (e.g., user 104). The transaction data can include a transaction value paid for by the first participant. In some embodiments, the method receives identification data identifying the second participant. The method determines, based at least in part on the transaction data, a portion of the transaction value associated with the second participant, the portion of the transaction value being less than the full transaction value. The method causes a notification to be generated and sent to the second participant, the notification including the portion of the transaction value.

In some instances, a group of people may share the cost of an event, such as a lunch meal, a gift purchase, a rental of a car or hotel, where one of the participants of the event offers to pay the cost of the event. The participant who pays the cost of the event, also referred to as the payer, can use a payment device (e.g., a credit card, a debit card, a prepaid card) that belongs to the participant to make the payment at a merchant. In some embodiments, the payer charges the total cost (or partial cost) of the event to a single payment card (e.g., credit card, debit card) belonging to the payer, where the total cost (or partial cost) covers goods and services attributed to or associated with more than one participant of the event.

Upon conclusion of an event, user 102 may pay for a total cost or a portion of the total cost of the event using payment device 126. As shown at step 1, payment device 126 may interact with access device 128 such as a point of sale (POS) terminal. For example, the user may take a debit card and swipe it though an appropriate slot in the POS terminal. The access device may be at a merchant in communication with merchant computer 130. Examples of access devices in addition to POS devices include cellular phones, PDAs, personal computers (PCs), tablet PCs, handheld specialized readers, set-top boxes, electronic cash registers, ATMs, virtual cash registers, kiosks, security systems, access systems, and the like.

Alternatively, the POS terminal may be a contactless reader such as a radio frequency (RF) antenna or a magnetic stripe reader that can interact with the payment device. The payment device may be a contactless device such as a contactless card or a phone. For example, the user may take a contactless card or a phone and pass it in front of the contactless reader to transmit financial information stored on the device.

At step 2, merchant computer 130 may receive communications from access device 128 that interacts with payment device 126. At step 3, an authorization request message may be transmitted from merchant computer 130 to acquirer computer 132. After receiving the authorization request message, at step 4, acquirer computer 132 may then transmit the authorization request message to payment processing network 134. In response to receiving the authorization request message, payment processing network 134 may either reject the authorization request message and cancel the transaction, or accept the authorization request message and forward it to issuer computer 136 associated with payment device 126. At step 5, payment processing network 134 accepts the authorization request message and forwards it to issuer computer 136.

After receiving the authorization request message, issuer computer 136 may perform a number of authorization, authentication, and fraud detection processes in order to make an authorization decision. At step 6, issuer computer 136 may then generate and send an authorization response message to payment processing network 134 indicating whether or not the transaction is approved. At step 7, payment processing network 134 may transmit the authorization response message to acquirer computer 132 which may then, at step 8, transmit the authorization response message back to merchant computer 130.

After merchant computer 130 receives the authorization response message, merchant computer 130 communicates the authorization response message to access device 128 at step 9. Access device 128 communicatively connected to merchant computer 130 may provide the authorization response message to user 102 at step 10. The authorization response message may be displayed by the POS terminal, or may be printed out on a receipt.

After the payment is processed by payment processing subsystem 122, user 102 can access a collaboration service (e.g., via an application on a mobile device, via a website) to manage and track payments owed by other participants of the shared event. In some embodiments, other participants of the event (e.g., user 104 and/or user 106) may also access the collaboration service to manage and settle the payments owed to the payer. Further, in some embodiments, the users may access the collaboration service via a collaboration client application (not shown) running on the mobile device. The collaboration client can include any suitable software that provides front end functionality of the collaboration service to the users.

In some instances, collaboration client may provide a user interface (such as a series of menus or other elements) that allows the user to manage and settle a payment. The collaboration client running on mobile devices 108, 110, and 112 can interact with collaboration server 118 (or payment processing network 134) via network 114 (e.g., the Internet) to form a communications channel, such as through an IPG 116.

In some embodiments, collaboration client running on mobile devices 108, 110, and 112 are in operative communication with collaboration server 118 via network 114, without going through IPG 116. IPG 116 can be in operative communication with collaboration server 118 and payment processing network 134. Although IPG 116 is shown as being a separate entity in FIG. 1, IPG 116 could be incorporated into payment processing network 114, or could be omitted from system 100.

Upon obtaining access to the collaboration service, mobile device 108 may create a new instance of an event for the event at hand. User 102 can create a new event and input information regarding the payment transaction including the total cost or a partial cost incurred at the event (also referred to as a transaction cost or value), participants of the event, and apportionment data for the participants that may indicate the portion of the transaction cost that each participant is responsible for repaying user 102. User 102 may also input additional information regarding the event such as a frequency at which reminders should be sent to the participants who still have not settled their payments with user 102.

After the new instance of the event is created and the event data including the transaction data and the participants associated with the event is identified, device 108 can send the event data through network 114 (e.g., the Internet) at step 11, which can then be directed to collaboration server computer 118 via IPG 116 at step 12. Device 108 can also send the event data through network 114 to collaboration server computer 118 without going through IPG 116 in some embodiments. Upon receiving the event data, collaboration server computer 118 may process the information, compute a portion that each participant owes, and generate notification messages to be sent to the participants. In some embodiments, collaboration server computer 118 can access collaboration database 120 to identify the devices associated with the other participants identified in the transaction data.

At step 13, collaboration server computer 118 causes one or more notification messages to be generated and forwarded to IPG 116. Alternatively, collaboration server computer 118 can forward one or more notification messages to network 114 directly without going through IPG 116. The one or more notification messages are then sent to mobile devices 110 and 112 at steps 14a and 14b via network 114. In one embodiment, devices 110 and 112 each receive a notification that users 104 and 106, respectively, owe a portion of the shared cost to user 102. After receiving the notifications, users 104 and 106 may settle their portions of the transaction cost via a number of different ways, which may be further described below.

At steps 15a and 15b, messages indicating that users 104 and 106 have paid are sent to IPG 116 via network 114 and then to collaboration server computer 118 at step 16. Users 104 and 106 can also send messages to collaboration server computer 118 without going through IPG 116. In some embodiments, Collaboration server computer 118 can then generate a notification message for user 108 to inform user 108 that payment has been settled. The message is forwarded to IPG 116 at step 17 and then to mobile device 108 via network 114 at step 18. Alternatively, the message is forwarded to mobile device 108 via network 114, without going through IPG 116.

Further, in some embodiments, one or more itemized receipts can be provided to one or more of devices 108, 110, and 112 such that the participants may view and identify goods and/or services (e.g., via a mobile app or a website) for which each participant may be responsible. Mobile devices 108, 110, and 112, can obtain the itemized receipts from merchant computer 130 in some embodiments. In other embodiments, collaboration server computer 118 can obtain transaction data from payment processing network 134 and create an itemized receipt that may be provided to mobile device 108, 110, and 112. As such, users 102, 104, and 106 may view the itemized receipts and select apportionment methods (also referred to as allocation methods) (e.g., split evenly, item-by-item) using collaboration service.

Having described an example of a collaboration system 100 that enables a user to pay for a group of participants using a payment device of the user and settle individual portions of the bill with the participants, an example of a process that may be performed by a processing network such as that shown in FIG. 1 will now be described in greater detail with respect to FIG. 2.

Figure 2:
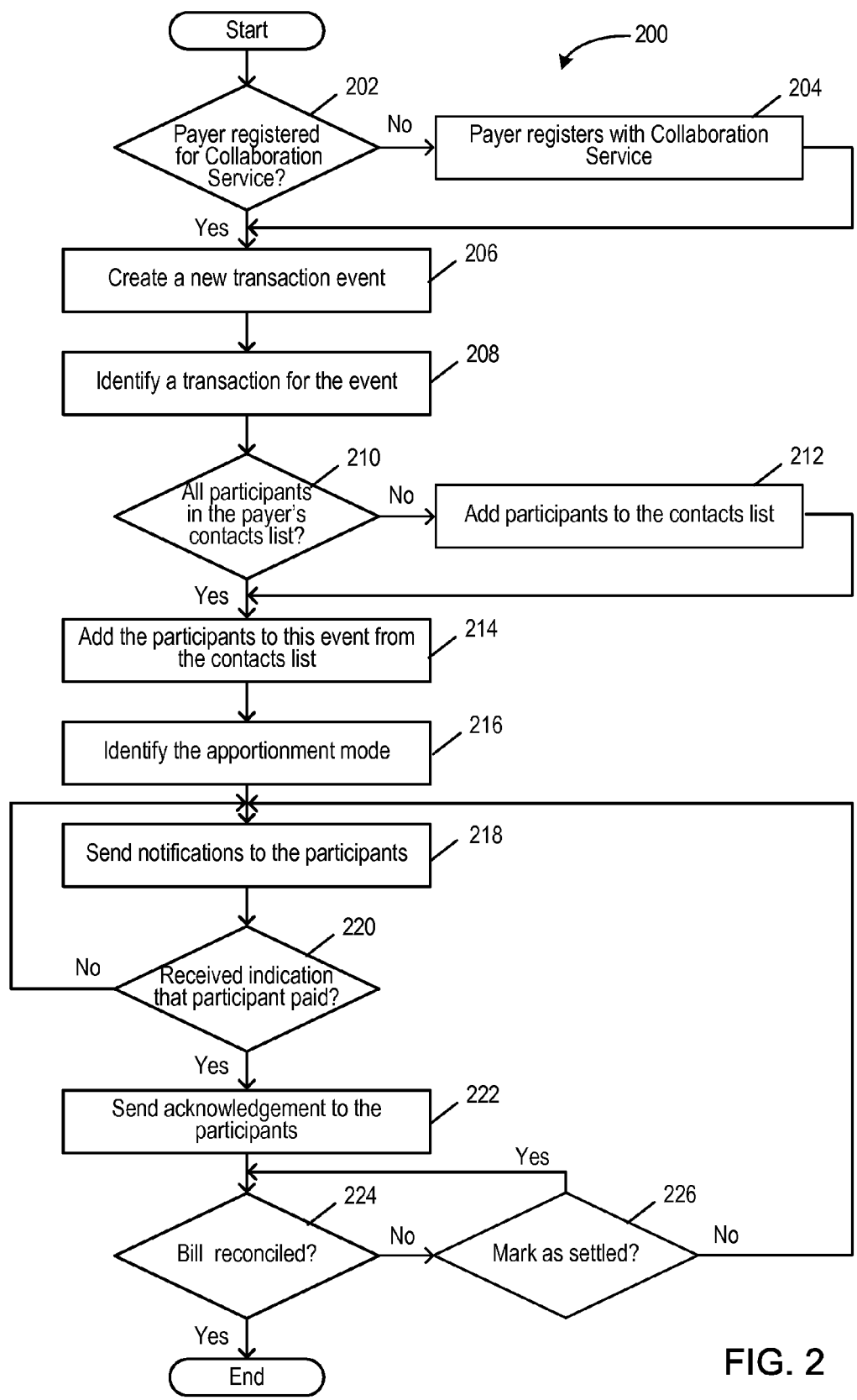
FIG. 2 illustrates an example process for settling a payment transaction in accordance with some embodiments of the invention.

FIG. 2 illustrates an example process 200 for settling a payment transaction in accordance with some embodiments of the invention. The figure depicts a set of functions, processes, operations, or method steps that may be used to implement an embodiment of the invention to permit a group of people to share the cost of an event, such as a meal, the purchase of a gift, etc. The processing illustrated in FIG. 2 may be implemented in software (e.g., computer-readable instructions, code, programs, etc.) that can be executed by one or more processors and/or other hardware components. Additionally or alternatively, the software may be stored on a non-transitory computer-readable storage medium.

First, at block 202, a determination can be made as to whether a payer (e.g., user 102 in FIG. 1) is registered with a collaboration service. As described, the collaboration service can provide a set of tools that enables a user to track, manage, and settle payments owed by participants (e.g., users 104 and 106 in FIG. 1) in a shared transaction event. A payer can be an individual who paid for the event (a total or a portion of the cost of the event) and is the person whom other participants of the event have agreed to reimburse in whole or in part. In some embodiments, the payer can be determined to be registered with the collaboration service if the payer has an account with the collaboration service. The payer can then access the collaboration service by logging into the payer's account (e.g., via an application running on the payer's computing device or via a website accessible through the payer's computing device).

At block 204, the payer may register an account with the collaboration service if the payer has not registered with the collaboration service. In some embodiments, the payer can register with the collaboration service by providing a username and a password and/or additional profile information. The registration process may be further described below in FIG. 7. Once the payer registers an account with the collaboration service, the payer can log into the payer's account At block 206, the payer can create a record or an instance of a transaction event in the collaboration service. Upon launching an application or a website on the payer's computing device, the user can create an instance of a new transaction event by providing event data including a date, a time, a description of the event, etc. in either a user interface generated by a collaboration server (e.g., collaboration server computer 118 in FIG. 1) or a form on the website. In some instances, the user may create the event instance by sending a message to a specified address or phone number. The event instance may be created before or after the event and the transactions associated with the event has occurred. For example, the payer may create an event titled "happy hour" before the actual outing takes place.

At block 208, the payer may identify a transaction for the event. In some embodiments, the payer's computing device (e.g., mobile device 108 in FIG. 1) can receive transaction data from the payer (or other participants) identifying the transaction for the event. For example, the user may input information pertaining to the event such as a description of the event, a time and a place of the event, goods and/or services involved in the event, the transaction costs incurred in the event, participants involved in the event, etc.

In some embodiments, the collaboration service (e.g., collaboration server computer 118 in FIG. 1) may compile a list of payment transactions performed by the user using the payment device. The payer may identify the transaction for the event at hand by selecting a particular transaction from the list (such as that shown in FIG. 3). In some embodiments, the payer may search a transaction database maintained by a payment processing organization, an issuer, or a third party service provider that contains records of payment transactions conducted using the payer's payment device. The collaboration service may also maintain a database (e.g., collaboration database 120 in FIG. 1) that includes records of payment transactions conducted using payment devices that the payer has previously registered with the collaboration service. The computing device may allow the user to input search terms to identify a particular transaction from the transaction database.

Figure 4:
FIG. 4 depicts a user interface display that allows the user to view the transaction details for an event in accordance with some embodiments of the invention.

As shown in FIG. 3, a list of transactions may be displayed on a user interface of the payer's computing device. After the user of the collaboration service specifies a set of search parameters (e.g., time range, status) for the list of transactions, the user interface may present the list of transactions falling within the criteria. The user may select a transaction from the list to view the transaction details for each event, as shown in FIG. 4. FIG. 4 depicts a user interface display 400 that allows the user to view the transaction details for an event in accordance with some embodiments. In some embodiments, the transaction information may be accessible from the payment processing organization that is involved in the settlement and clearance aspects of a transaction. The payment processing organization may also be responsible for operating the collaboration service in some embodiments.

Returning to FIG. 2, at block 210, a determination can be made as to whether all the participants in the event are in the payer's contacts list. During registration for the payer's account or after, the payer may have designated a number of contacts including friends and family as part of the payer's contacts list. If not all the participants of the event are part of the payer's contacts list, at block 212, the user may add the participants to the contacts list. In some embodiments, the payer may add contacts to the payer's contacts list by manually entering the contact information of those contacts into the payer's account profile or by identifying them via social networks. Further, in some embodiments, the payer's device may detect one or more devices (e.g., via Bluetooth, via near field communication (NFC)) that are within a threshold distance and identify the device and their users to be part of the payer's contacts list.

At block 214, the payer can identify the contacts who are participants of the event and add those participants to the event from the contacts list. In some embodiments, the payer may be provided with user interface tools such as drop-down menus in a user interface display such that the user may select the one or more contacts to be designated as a participant in a shared event. Further, in some embodiments, the participants may be automatically populated and identified as participants of the event when a set of computing devices associated with contacts in the user's contacts list (e.g., the contacts list associated with the collaboration service or one of the user's social networks) is identified as being within a threshold distance of the user (e.g., via location-determination techniques such as GPS, via the user's device detecting the participants' devices through NFC, etc.).

At block 216, the payer (or other participants in the event) may identify the apportionment method. For instance, the payer or other participants may select an apportionment method for the event to be an even-split mode or a pro-rata mode. In some embodiments, a user's computing device can present a user interface that enables the user to select an apportionment mode from a list including (1) splitting the cost evenly, (2) splitting the cost according to entered data (an amount allocated to each person, a percentage allocation allocated to each person, etc.), (3) splitting a designated portion of the cost of the event (a) evenly or (b) as indicated. Option (3) permits an amount less than the entire cost of the transaction to be the subject of the shared payments. The entity that operates the collaboration service, or the collaboration server, may receive the user indication of the distribution mode from the set of allocation options as to how the cost of the event will be apportioned among the participants. When the collaboration server receives an identification of specific goods and/or services of which the costs each participant may be responsible, the collaboration server may further compute the total cost each participant owes to the payer (e.g., by including tax and tip).

At block 218, the collaboration server can generate and send notifications to the participants in response to receiving the apportionment method. The notification or message can include an identification of the transaction involved, such as the total transaction cost, the date, the merchant, the location, etc. and an indication of the portion that the recipient owes the payer. An example of a notification can be seen in FIG. 5. FIG. 5 depicts a user interface display 500 that can be presented to a participant to notify the participant of his or her participation in the shared event, details of the event, the amount he or she owes the payer, and information regarding one or more payment methods that may be used by the participant.

In some embodiments, the notification may take any suitable form of communication such as a voice call, a text message, an e-mail message, etc. In some embodiments, the form and delivery channel can be determined for each recipient by a profile or preference set by that person. In some embodiments, the notifications may provide the recipient with one or more ways in which the recipient may make a payment to the payer. The different ways in which the recipient can pay the payer or settle the payment with the payer will be described in greater detail with reference to FIG. 11.

At block 220, a determination can be made as to whether an indication that the participant has paid has been received. In some embodiments, once the participant pays the allocated portion of the transaction cost, the collaboration service can receive a notification that the funds have been transferred to the payer's account and that the payment has been settled. In some embodiments, the user may receive a payment from a participant in the form of cash or through a third-party money transfer service. In such embodiments, the user may indicate that the payment from the participant has been received by selecting a checkbox in a user interface provided by the collaboration service (e.g., using the mobile app or the website).

At block 222, if an indication that the participant has paid is received, an acknowledgement of receipt of the payment is sent to the participant. In some embodiments, the collaboration service can send the acknowledgement message to the participants when all the payments from the participants in the event have been settled (i.e., when the total of the verified payments that have been made to the payer is equal to the amount that the payer paid for the event) to inform the participants of complete settlement and closure of the instance of the event.

Further, in some embodiments, when the collaboration server receives an indication that a participant has settled a payment with the payer, the collaboration server may generate a notification to the payer to inform the payer of such. FIG. 6 depicts a user interface display 600 that may be presented to the payer to notify the payer that a participant has settled a portion of the cost of the shared event. The notification message can further identify the amount paid, details regarding the event, the remaining un-reimbursed balance, etc.

Returning to FIG. 2, if no indications that a participant has paid has been received, then process 200 returns to block 218 and one or more notifications or reminders are sent to the participants. In some embodiments, the collaboration service determines whether any notifications have been received for a certain period of time (e.g., a day, three days, a week, etc.) before additional notifications or reminders are sent to the participants. The period of time in which the determination is made to send. additional reminders can be configurable by a user in some embodiments.

At block 224, a determination is made as to whether the total transaction cost (also referred to as transaction value) is reconciled with the participants' payments to the payer. If the total transaction cost is determined to be reconciled, then process 200 ends. Some embodiments may determine that the total transaction cost is reconciled when the total of the verified payments that have been made to the payer is equal to the amount that the payer paid for the event. If process 200 determines that the total transaction cost is not reconciled or the total of the verified payments that have been made to the payer is not equal to the amount that the payer has paid for the event, then at block 226, a determination is made as to whether the user has marked any owed payments as being settled.

In some embodiments, the payer may designate the amounts as having been settled as a result of an "offline" payment (e.g., a transfer of cash), a barter agreement, or a decision by the payer to "write-off" the obligation of that participant to reimburse the payer. The collaboration service may present the payer the option of designating one or more of the participants' unpaid amounts as having been settled. Upon receiving a user indication that the payer has designated one or more payments as having been settled (either "offline" or "written-off"), the collaboration server returns to block 224 to determine whether the total transaction cost has been reconciled with the participants' payments. If the total transaction cost has been reconciled, then the record or instance of the event may be marked as closed and process 200 ends. In the event that the user does not mark any payments as having been settled, process 200 returns to block 218 to send additional notifications or reminder messages to the participants. The collaboration service may send reminder messages to the participants who have not settled their payments periodically based on the payer's preferences setting in some embodiments or until the bill has been reconciled.

Figure 7:
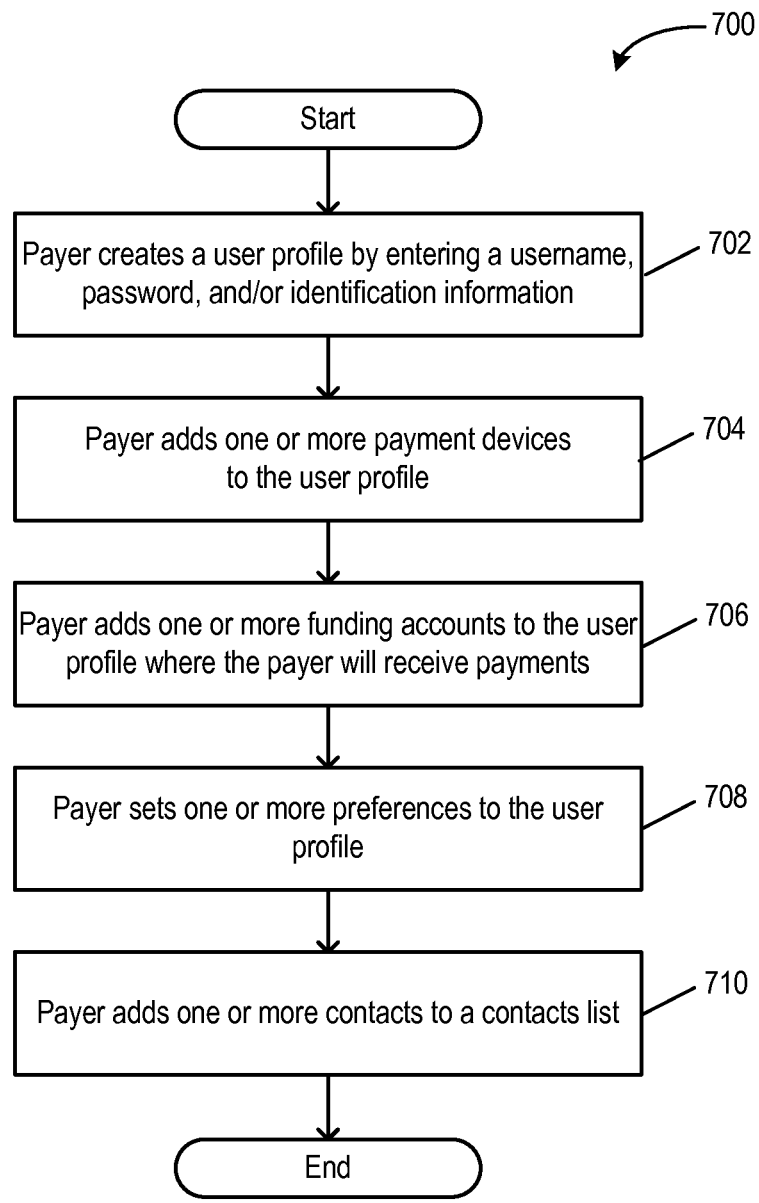
FIG. 7 illustrates an example process for registering a new user to a collaboration service in accordance with some embodiments of the invention.
Figure 9:
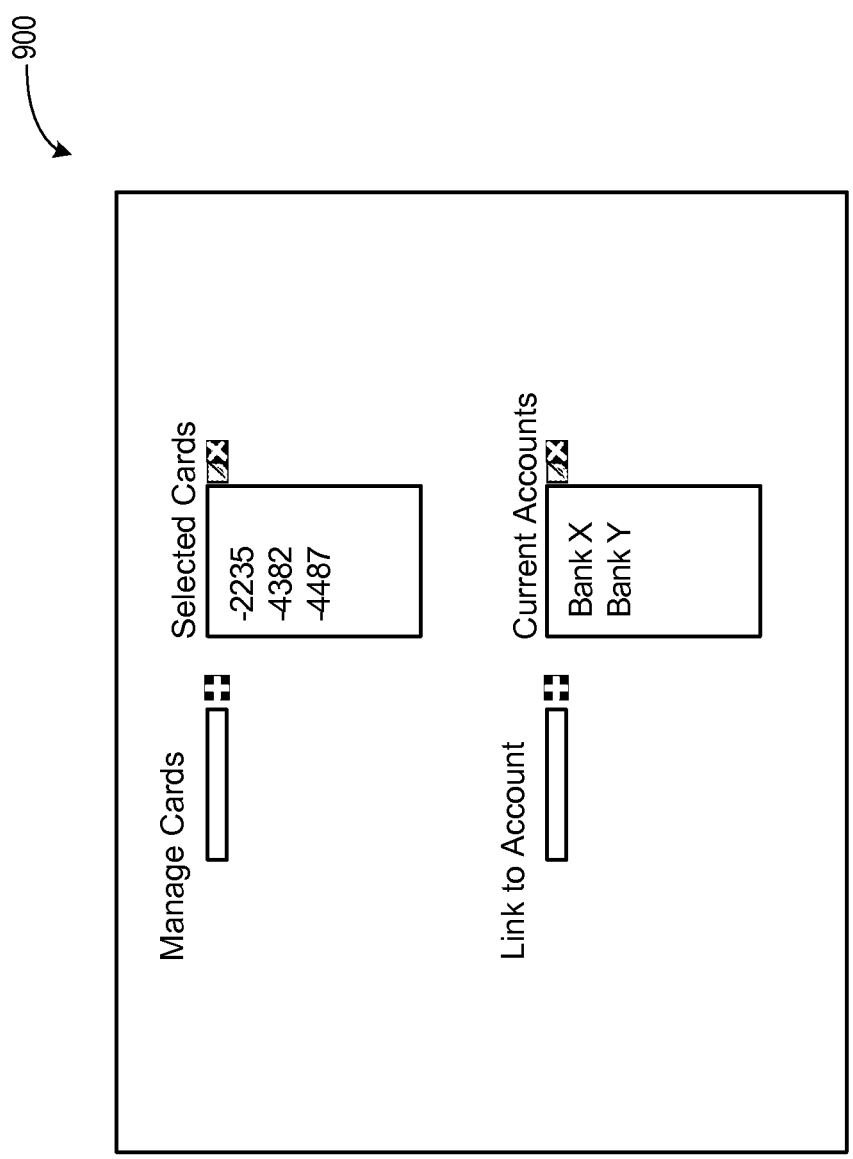
FIG. 9 depicts a user interface display that allows the user to manage the payment devices or accounts that the user may register with the collaboration service in accordance with some embodiments of the invention.
Figure 10:
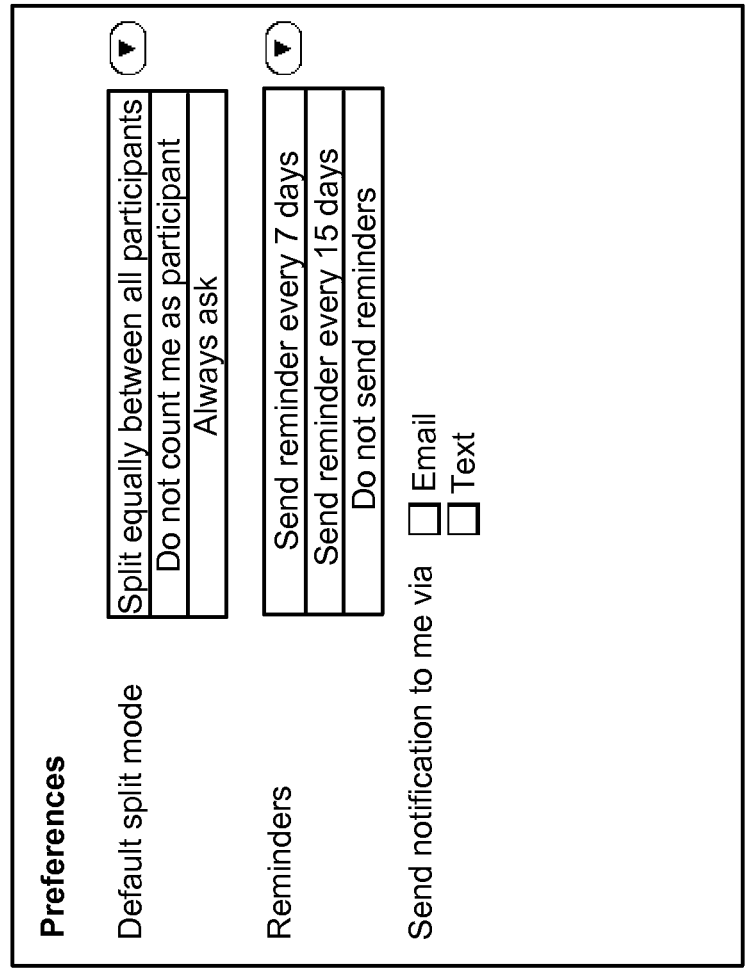
FIG. 10 depicts a user interface display that allows the user to input user preference data in accordance with some embodiments of the invention.

FIG. 7 illustrates an example process 700 for registering a new user to a collaboration service in accordance with some embodiments of the invention. In some embodiments, process 700 can be performed at block 204 in FIG. 2. As discussed with reference to FIG. 2, process 700 may be used to enable a payer of an event to enroll in the collaboration service. The payer may enroll in the collaboration service by entering various requested information into a webpage, form, message, etc. FIG. 7 can be described by reference to FIGS. 8-10. FIGS. 8-10 represent example user interface displays that be presented to a user of the collaboration service (e.g., a payer or a participant) in accordance with some embodiments.

At block 702, to register for an account in the collaboration service, the payer can create a user profile by entering a username, password. In some embodiments, the collaboration server (e.g., collaboration server computer 118 in FIG. 1) may request the user to provide identification and authentication data when the user is registering for a new account (by presenting a user interface display to the user as shown in FIG. 8). For instance, in addition to the username and password, the payer may be requested to enter user identification information, including the payer's name, mailing address, email address, telephone number(s).

FIG. 8 depicts a user interface display 800 that allows the user to create a new user account with the collaboration service. User interface display 800 may be displayed to the payer, for example, when the payer launches an application on the payer's computing device (e.g., mobile device 108) or when the payer is accessing the collaboration service via a website. The user may be prompted to provide a username and password in order to log into an account upon launching the application or website. Otherwise, the user may register for a new account with the collaboration service by inputting the requested basic information as shown in FIG. 8.

Returning to FIG. 7, at block 704, the payer may add one or more payment devices to the user profile. In some embodiments, the collaboration server may request the user to provide information regarding one or more payment accounts or payment devices that the payer would like to use in conducting payment transactions that will be the basis for an event. As such, the collaboration service can track transactions performed using the payment device that the payer specifies as being associated with the event. For example, the collaboration service may automatically track and populate a list of transactions associated with a particular payment card that the payer had designated as the payment device for the event. The collaboration service can retrieve the transactions associated with the payment device from a payment processing organization, issuer, or third party. In some embodiments, particular payment devices may be associated with certain transactions (e.g., identified by the location, the merchant, the participants, the time, etc.) or events such that the list is automatically populated without the user manually creating an event each time.

Further, the collaboration service may also allow participants who have registered one or more payment devices and/or accounts to the user profile to use the payment devices and/or accounts in settling a payment to a payer for an event. Via user interfaces provided by the collaboration service, the participant may specify which payment account or device the participant desires to use either for an event or for repaying a payer in an event.

The collaboration server may request the payer to fill out a form with an account number (such as for a credit card, debit card, prepaid card, or other form of consumer payment device) and/or other information regarding the payment accounts or devices (e.g., expiration date, pin number, etc.). As shown in FIG. 9, a user interface display 900 may be presented to a user to permit the user to manage (e.g., add, delete, edit) the payment devices or accounts that the user may register with the collaboration service. Via user interface display 900, the user may select and manage the user's accounts that may be used in conducting a payment transaction for an event.

At block 706, the payer may add one or more funding accounts to the user profile to indicate the accounts at which the payer would like to receive payments. In some embodiments, the collaboration server computer may request the payer to provide information or to identify an account into which payments will be made by the participants in an event as part of the process of reimbursing the payer. This account may be a savings account, checking account, an account linked to a debit card, etc. For example, the payer may desire that all reimbursement payments be made directly to the payment account used to pay for the event. User interface display 900 in FIG. 9 also permits a user to select the funding account at which the user would like to receive payments.

In some embodiments, the payer may also be asked to enter data or information to set preferences (e.g., notification methods, channels, and frequencies) if this information has not already been provided as part of the registration process. Returning to FIG. 7, at block 708, the payer may set one or more preferences to the user profile. The collaboration server computer may request the user to provide information related to the payer's preferences for various features or options of the collaboration service (e.g., having a default apportionment mode set to a "split mode", the frequency or format of reminders and notifications regarding an event, the preferred channel for use in communicating information about the event, etc.). The information and preferences provided by the payer may be saved in a data file or record associated with the payer's user profile (e.g., in collaboration database 120 in FIG. 1). As shown in FIG. 10, user interface display 1000 may be presented to the user to allow the user to input user preference data in accordance with some embodiments.

At block 710, the payer may add one or more contacts to a contacts list associated with the payer's account with the collaboration service. Upon adding the one or more contacts to the contacts list, the payer may identify and add participants of a shared event to an instance of an event (such as that shown in block 214 of FIG. 2) by selecting the contacts from the contacts list. In some embodiments, the user may add the one or more contacts to the payer's contacts list by manually inputting information about the one or more contacts that can identify the contacts. The user may also add the contacts by accessing a social network account associated with the payer to obtain the one or more contacts associated with the social network account, etc. In some embodiments, the contacts lists associated with each of the payer's social network accounts is accessible via the user interface display presented by collaboration service, such as that shown in FIG. 11.

Figure 11:
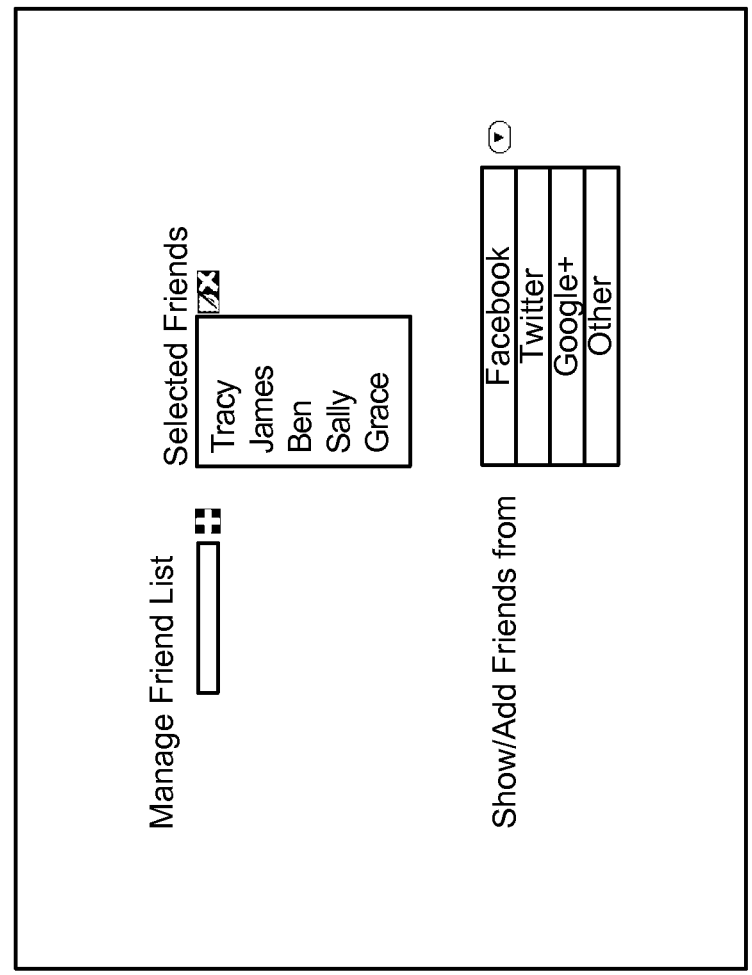
FIG. 11 depicts a user interface display that allow the user to manage contacts that may be added to shared events for the collaboration service in accordance with some embodiments of the invention.

FIG. 11 depicts a user interface display 1100 that may be presented to a user to allow the user to manage contacts that may be added to shared events for the collaboration service. In this example, the user may access contact lists associated with one of the payer's social networking accounts (e.g., Facebook®, Twitter®, etc.). The user may thereby add one or more contacts from the contacts lists to a shared event as participants in the shared event. User interface display 1100 further allows selection and management of the user's contacts list by allowing the user to add, delete, and edit the contacts and associated contact information.

Figure 12:
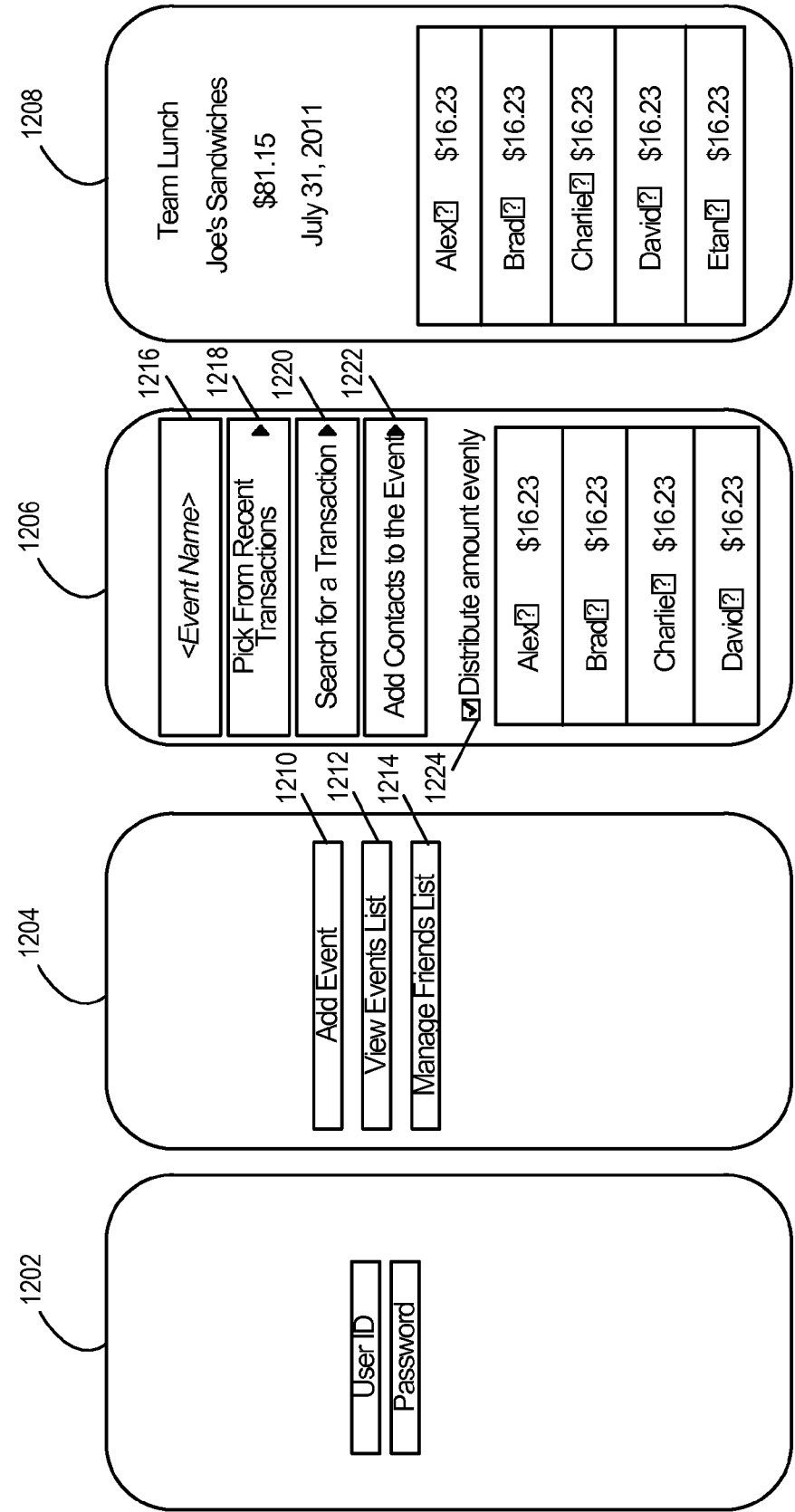
FIG. 12 illustrates an example sequence of screen images for creating an event instance for a transaction event using the collaboration service in accordance with some embodiments of the invention.

FIG. 12 illustrates an example sequence 1200 of screen images 1202-1208 that might be presented to a payer or a user of a collaboration service on a mobile device when the user is using the collaboration service. As shown in screen image 1202, the user of the collaboration service may first log into the user's account by entering authentication information including a username and a password. Upon logging into the user's account, the user (either the payer or another participant in the shared event) may create a new event or define a new instance of an event by selecting user interface element 1210, view previously entered events and their status by selecting user interface element 1212, or manage a contacts list by selecting user interface element 1214. Different embodiments may provide different set of options in the landing page.

In this example, the user has selected to add a new event. As described in block 206 in FIG. 2, the user may add a new event by manually inputting information associated with the event (e.g., time, date, transaction value, participants, a payment transaction corresponding to the payer's payment for the event, etc.) in editable field 1216 or by selecting a transaction from a list populated by a collaboration server (e.g., a recent transactions list, a list provided based on a search through a database) upon selecting user interface element 1218. The user may also search for the transaction by selecting user interface element 1220. Further, the user may add participants to the event (e.g., by selecting user interface element 1222 and by identifying the contacts who will be responsible for paying for some portion of the cost of the event), view a summary of the information about the event and confirm those details for the inventive system, etc.

Further, the user may indicate an apportionment method for the event. In this example, the user has selected to distribute the amount evenly, as indicated by the checked box 1224. As such, the amount or the portion of the total transaction cost can be computed (e.g., locally by the user's computing device or by a collaboration server) and a summary (as shown in screen image 1208) may be presented to the user such that the user can view the event details. Subsequently, the user may manage the payments owed by other participants in the group by indicating whether any of the payments would be "written-off" or settled offline. The user may also manage the frequency of the notifications and reminders to be sent to the participants who have unpaid balances, etc.

Figure 13:
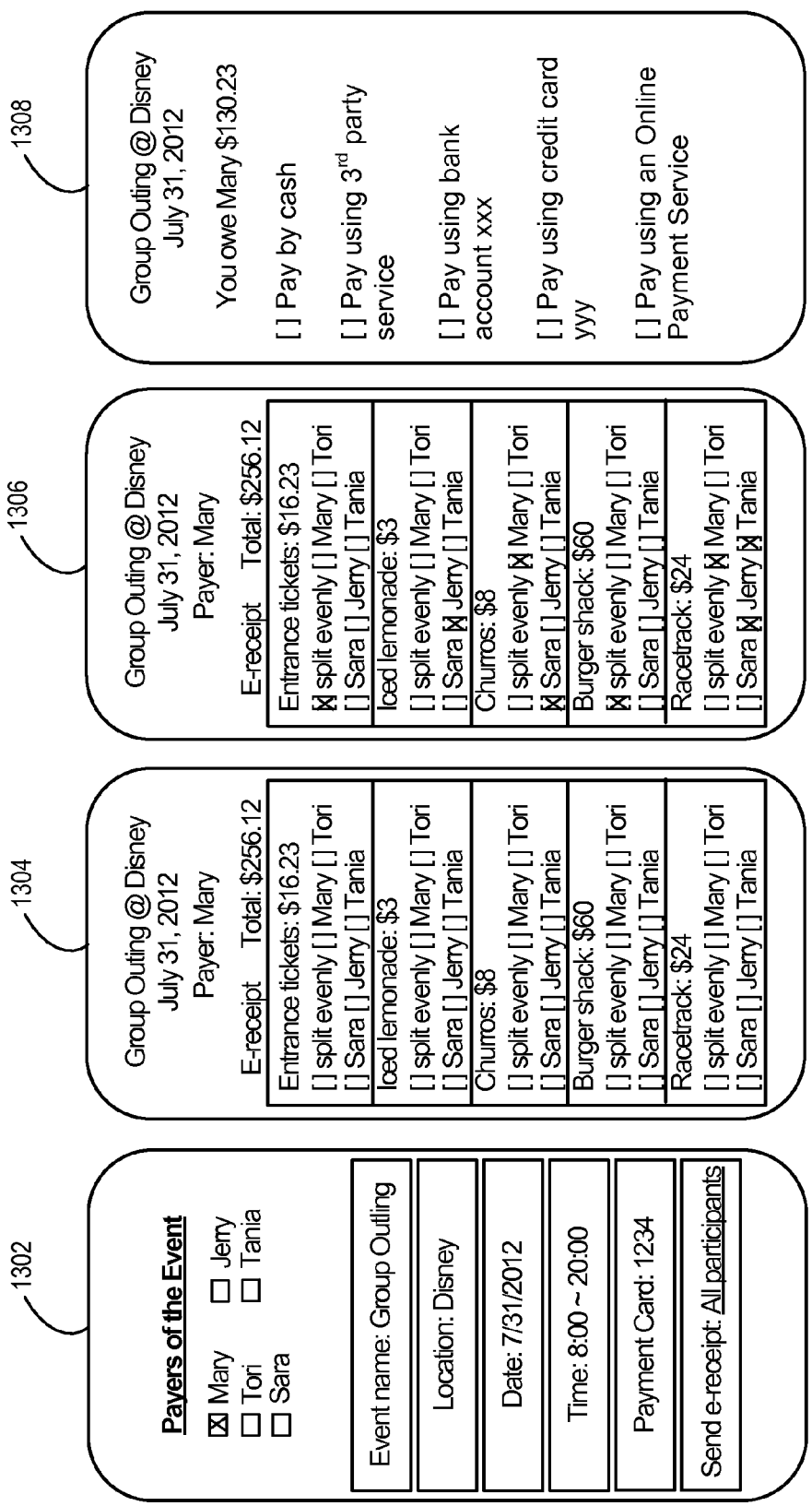
FIG. 13 illustrates an example sequence of screen images for managing and settling payments owed by one or more participants in an event in accordance with some embodiments of the invention.

FIG. 13 illustrates an example sequence 1300 of screen images 1302-1308 for managing and settling payments owed by a participant in an event according to some embodiments. As mentioned, a user of a collaboration service (e.g., a payer, a participant in the event) may create an instance of an event before the event has occurred. For instance, a participant in a group event can create an instance of an event for a group outing that may take place in the future. As shown in screen image 1302, the participant may designate event data including a name, location, date, time range, a payment card that would be used in performing the payment transactions for the group outing, etc. One of the participants may also be designated as the facilitator of the event, in other words, the person who is in charge of paying for the event or also referred to as the payer.

In some embodiments, as a number of transactions are performed during the event, the collaboration service may track and populate a list of transactions (i.e., a digital receipt that includes the list of transactions) that may be associated with the event and present the list to one or more participants of the event. As shown in screen image 1304, a list of transaction determined to be associated with the event (e.g., based on the parameters and event data specified by the user such as that shown in screen image 1302) is populated. The one or more participants can then identify an apportionment method for each transaction. For instance, a payer or a participant may identify whether a transaction should be split evenly among the participants or whether particular transactions should be designated to particular participants in the group. In some embodiments, each transaction may be broken down further item-by-item similar to an itemized receipt such that the participants may identify particular goods and/or services within each transaction that may be allocated to and associated with each person.

As shown in screen image 1306, the participant has indicated the apportionment method for each of the transactions that are part of the event. For example, the participant has indicated to split the cost for the entrance tickets and the burger shack meal evenly while designating one or more participants to be responsible for the other transactions. In some embodiments, different participants in the event may provide input as to how to apportion the cost of the transactions. That is, more than one participant may input apportionment data to identify the itemized goods and/or services within each transaction that may be allocated to each participants.

After the apportionment method for each transaction has been identified, the collaboration server in some embodiments can compute a portion of the cost that each participant owes to the payer. In screen image 1308, an amount that a participant owes the payer can be presented to the participant and a number of payment methods from which the participant may select can be displayed. As shown in this example, the participant owes the payer $130.23. In response to receiving a selection as to which payment method the participant chooses, the collaboration server can process the payment from the participant to the payer in accordance with the selected payment method. A settlement process may be further described in FIG. 15 below.

In this example, the participant may choose to settle the transaction either by cash, by paying through a third party payment service, by wiring a transfer from the participant's bank account, by performing a payment transaction using the participant's credit card, or by performing a payment transaction via an online payment service associated with a payment processing network. Different embodiments may present a different number of options and different types of payment options to the participant.

Further, in some embodiments, the collaboration system may compute a customized transaction cost for each participant by computing additional costs associated with the goods and services (e.g., a tax and tip) that are associated with the participant. For example, after the system identifies that a particular participant has ordered the coffee and the sandwich, the system may determine the total amount that the particular participant owes by computing a tax and tip based on the determined amount.

As described, the participant may settle a payment with the payer via any of a number of options presented by the collaboration service. In some embodiments, the participant may settle the funds by physically deliver cash to the payer. In some instances, the participant can perform an electronic payment (e.g., via the Internet) and wire funds from a personal bank account or a credit card account (e.g., via a third party online payment service) to a funding account of the payer, which may be further described below.

Figure 14:
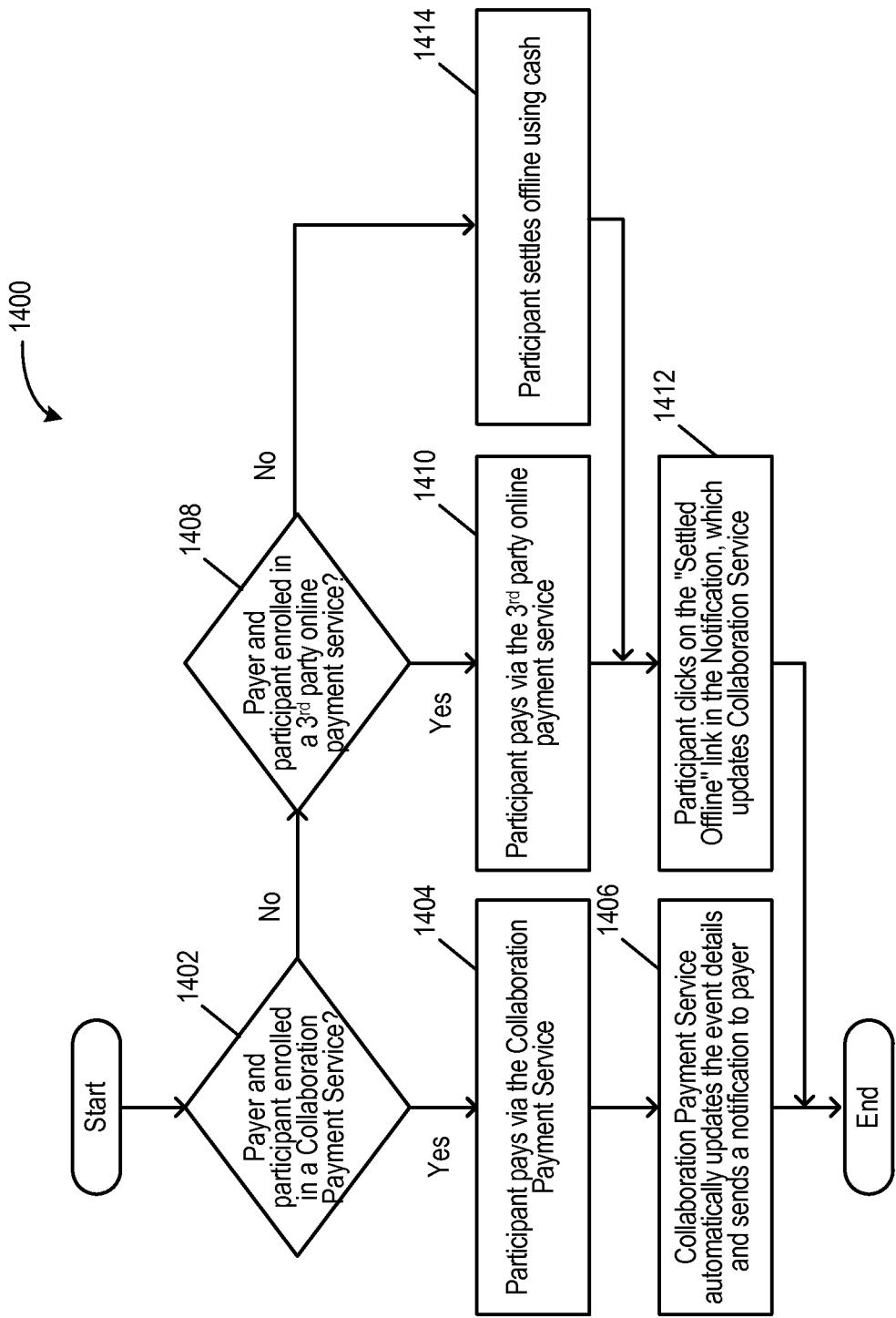
FIG. 14 illustrates an example process for settling a payment transaction between a payer and a participant of a shared event in accordance with some embodiments of the invention.

FIG. 14 illustrates an example process 1400 for settling a payment transaction between a payer and a participant of a shared event in accordance with some embodiments. At block 1402, a collaboration service can determine whether the payer and the participant are enrolled in an online payment service operated by the provider of the collaboration service (e.g., Visa). The online payment service operated by the provider of the collaboration service may also be referred to as a collaboration payment service.

Use of a common payment service may enable an easier, more user-friendly, more efficient, more secure, or otherwise more desirable transfer of funds. In some embodiments, the collaboration service can determine whether the payer and participant are both enrolled in the collaboration payment service by requesting the participant to provide identification information (e.g., username, authentication data such as a password). In some embodiments, the participant may be determined to be enrolled in the collaboration payment service when the participant activates a link included in a notification message received by the participant that informs the participant that the participant is responsible for a portion of the transaction cost of the event.

If the payer and the participant are determined to be enrolled in the collaboration payment service, at block 1404, participant can pay the payer via the collaboration payment service (e.g., an online payment service operated by the provider of the collaboration service). The collaboration payment service may facilitate a transfer of funds between an account of the participant and an account of the payer. In some embodiments, the participant may pay the payer by selecting a payment device (e.g., that the participant had previously registered with or added to the user account associated with the collaboration service such as that shown in block 704 in FIG. 7) and authorizing the transaction.

Upon successful completion in settling the payment, the event details may be automatically updated (e.g., by the collaboration server), notifying the payer that the payment has been received. As such, the payer may be able to view event details indicating that the participant has already repaid the payer. In some embodiments, the records for the event maintained by the collaboration service may be updated to reflect the payment made by the participant if the collaboration payment service is operated by the same entity as the one operating the collaboration service (or if not, is communicatively coupled to the collaboration service).

At block 1406, such updating of the data record may trigger the generation and transmission of a notification to the payer informing them that the participant has made a payment, the amount of the payment, and perhaps other information related to the payment or to the event.

If the payer and the participant are determined not to be enrolled in the collaboration payment service, at block 1408, a determination can be made as to whether the payer and the participant are both enrolled in a third party online payment service (e.g., Paypal). If the payer and the participant are determined to be enrolled in a third party payment service, then at block 1410, the participant may pay the payer via the third party online payment service. In some embodiments, the third party payment service allows the participant to add a number of payment devices and accounts such that the participant may select one to use for settling a payment.

At block 1412, the participant may select the "settled offline" link in the notification message. Upon receiving a user indication that the participant has settled the payment, the collaboration service may update the event details (e.g., in collaboration database 120 in FIG. 1) to indicate that the participant has settled the amount that the participant owes.

If the participant and payer are not both enrolled in a common payment service, then at block 1414, the participant may be provided an opportunity to indicate that they will settle their debt "offline". This typically means that the participant will make their payment in cash to the payer (or another form of value such as a barter agreement). If the participant decides to settle their debt "offline" they may indicate this by activating the appropriate user interface element. Doing so may cause the generation of a message to the payer and/or to the shared payment service system so that the appropriate record for the event can be updated and the relevant notifications, alerts, or messages can be generated and provided to the payer. In some embodiments, the participant may also be provided with a way to enter information regarding a payment service that they desire to use to reimburse the payer.

Figure 15:
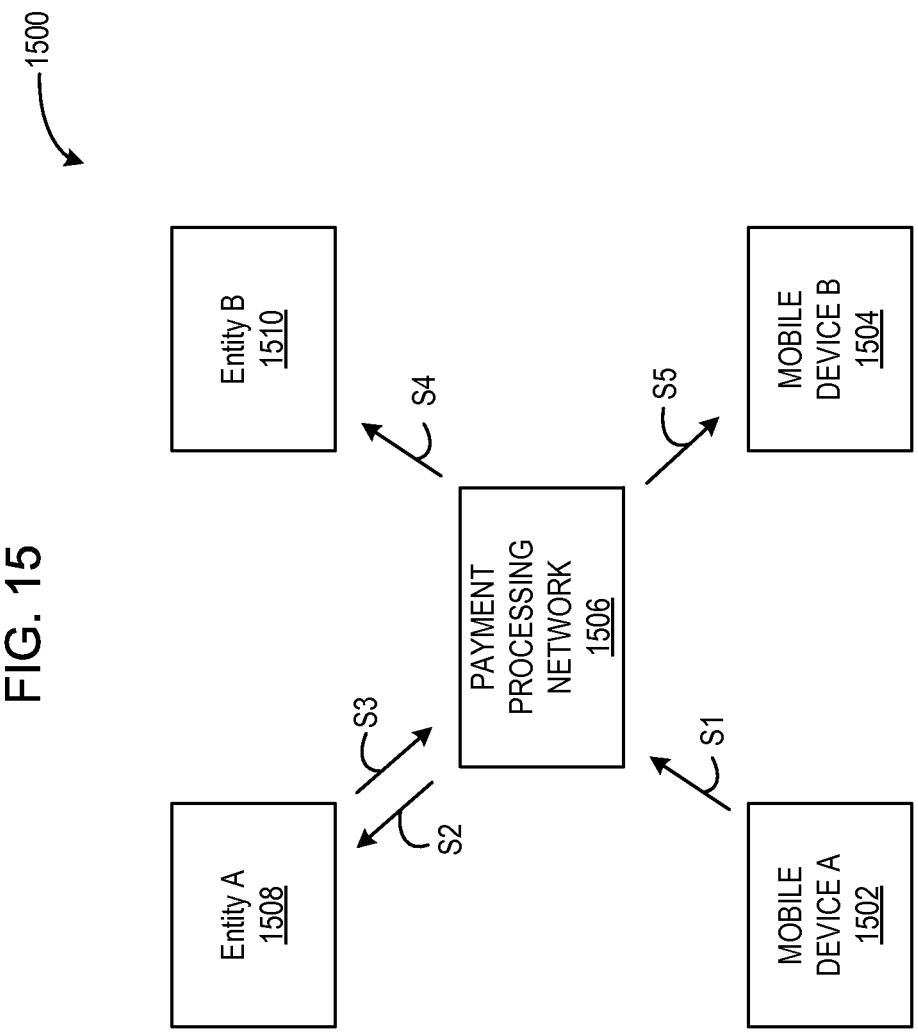
FIG. 15 illustrates a flow diagram describing how a collaboration service can facilitate a settlement of funds between a payer and a participant in accordance with some embodiments of the invention.

FIG. 15 illustrates a flow diagram 1500 describing how a collaboration service can facilitate a settlement of funds between a payer (e.g., user 102 in FIG. 1) and a participant (e.g., user 104 in FIG. 1) in accordance with some embodiments. A settlement process can be a process of transferring funds between a payment account associated with the participant and a payment account associated with the payer. In this example, a participant can use a mobile device 1502 to transfer funds to a payer of an event. In some embodiments, a payment card can be associated with mobile device 1502 such that the participant may facilitate a transfer of funds to the payer using mobile device 1502.

At step 1, when mobile device 1502 receives an indication that the participant desires to settle an amount with the payer, mobile device 1502 may send a request to a payment processing network 1506 to process the payment. At step 2, payment processing network 1506 can generate an authorization request and send the authorization request to entity 1508, which could be an issuer, a bank, a third party online payment service, and/or other types of financial institution or services. For example, in the instance that the participant desires to settle the payment using a credit card, entity 1508 may be an issuer.

At step 3, entity 1508 can send an authorization response message back to payment processing network 1506. If the participant of mobile device 1502 has access to adequate funds (or credit) in entity 1508, entity 1508 approves the transaction and sends an indication to payment processing network 1506 that the authorization is successful. An authorization response may then be sent to mobile device 1504 and entity 1510 at steps 4 and 5. Once the authorization has been successful, entity 1508 will transfer funds, directly or indirectly through payment processing network 1506, to entity 1510.

Entity 1510 can also be an issuer, a bank, a third party online payment service, and/or other types of financial institution or services as well, depending on the funding account/method (or payment account) specified by the participant receiving the payment (i.e., the payer). In the event that the payer has specified a funding account to be an account associated with a credit card of the payer, entity 1510 can be an issuer. As such, a clearing and settlement process may be conducted (e.g., by payment processing network 1506) where financial details are exchanged between entities 1508 and 1510 to facilitate the settlement between the participants. In some embodiments, authorization and settlement can occur simultaneously.

Embodiments implementing these and other features, including various combinations of the features described herein, may provide the advantages discussed above and/or other additional advantages. For example, because aspects of the disclosure provide systems and applications that enable users to track, manage, and settle payments owed by others, greater convenience is provided to users of such systems and applications. In particular, by providing such a platform that provides ease for groups to share in the cost of transactions, users are encouraged to use payment cards or devices in payment transactions. Further, aspects of the disclosure enable users to easily track transactions that are intended for sharing, thereby increasing the overall efficiency in conducting split payment transactions.

In addition to increasing the efficiency in settling payments between participants in an event, the collaboration system provides for greater interoperability between systems. As the collaboration service may be communicatively linked to a payment service in a payment processing system, the collaboration server may be readily updated by information accessible from the payment processing system. As such, a payer may be automatically informed of a settlement through a user interface provided by the collaboration service. When the collaboration service and the payment service (used by the participant in settling a payment with the payer) are operated by the same entity, there is improved reliability and improved transaction security as well.

Figure 16:
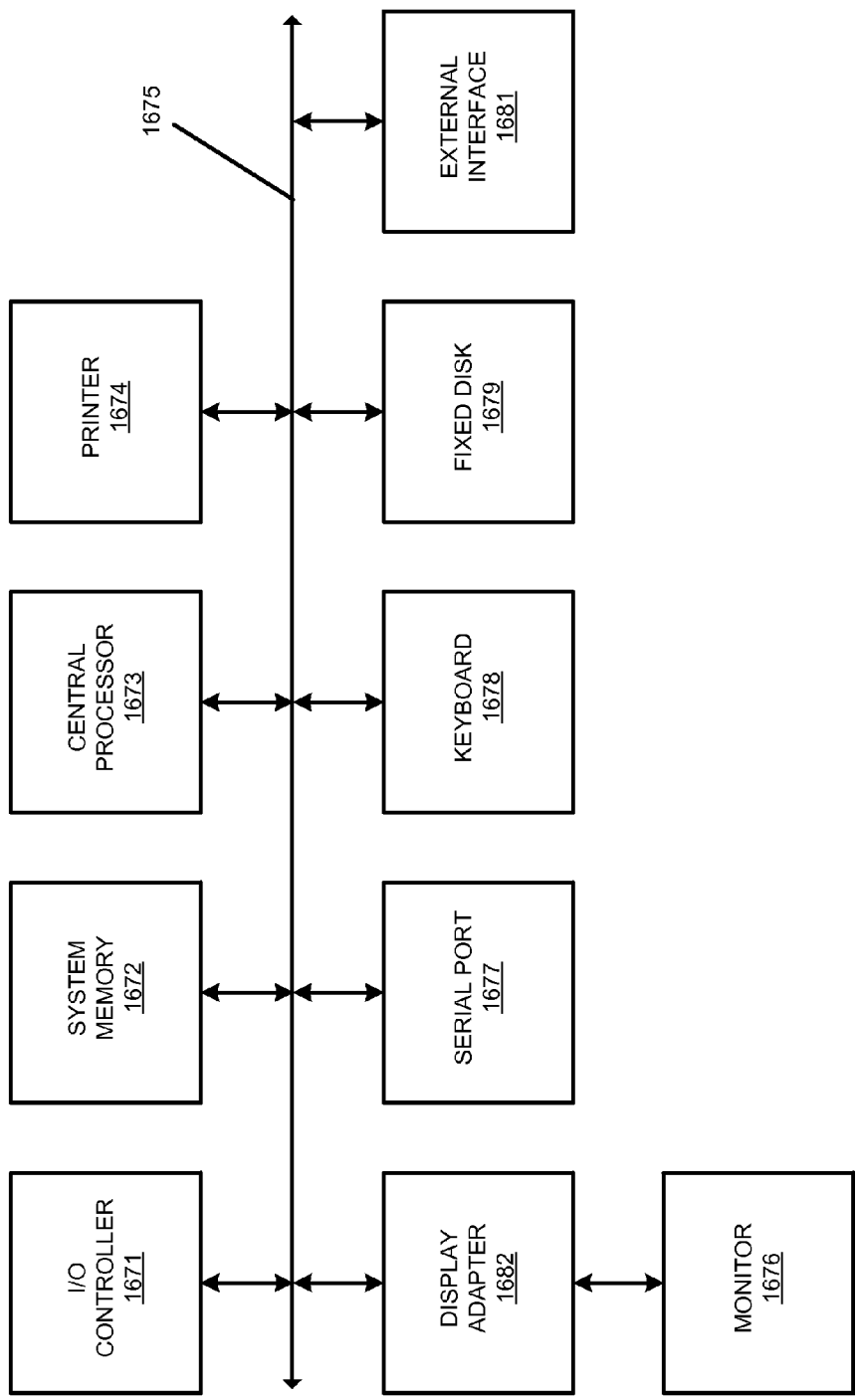
FIG. 16 shows a block diagram of a computer apparatus according to an embodiment of the invention.

FIG. 16 shows a block diagram of a computer apparatus according to an embodiment of the invention.

The various participants and elements may operate one or more computer apparatuses (e.g., server computers) to facilitate the functions described herein, and any of the elements in the figures may use any suitable number of subsystems to facilitate the functions described herein. Examples of such subsystems or components are shown in FIG. 16. The subsystems shown in FIG. 16 are interconnected via a system bus 1675. Additional subsystems such as a printer 1674, keyboard 1678, fixed disk 1679 (or other memory comprising computer readable media), monitor 1676, which is coupled to display adapter 1682, and others are shown.

Peripherals and input/output (I/O) devices, which couple to I/O controller 1671, can be connected to the computer system by any number of means known in the art, such as serial port 1677. For example, serial port 1677 or external interface 1681 can be used to connect the computer apparatus to a wide area network such as the Internet, a mouse input device, or a scanner. The interconnection via system bus 1675 may allow the central processor 1673 to communicate with each subsystem and to control the execution of instructions from the system memory 1672 or the fixed disk 1679, as well as the exchange of information between subsystems. The system memory 1672 and/or the fixed disk 1679 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited in this patent are hereby incorporated by reference for all purposes.

One or more features from any embodiment may be combined with one or more features of any other embodiment without departing from the scope of the disclosure.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
   presenting a graphical user interface associated with a collaboration service on a computing device for enrolling a user in the collaboration service;
   enabling the user to enroll in the collaboration service associated with a collaboration server;
   receiving, by the computing device, transaction data for a transaction event associated with a plurality of participants, the transaction data including a transaction value associated with the plurality of participants;
   receiving, by the computing device, a selection of a participant in the plurality of participants to be a payer of the transaction event, wherein the transaction value of the transaction event is paid for by the selected payer of the transaction event;
   determining, by the computing device, based at least in part on the transaction data, a portion of the transaction value owed by one or more remaining participants in the plurality of participants to the selected payer of the transaction event, the portion of the transaction value being less than the transaction value; and
   causing the collaboration server to generate and send one or more notifications to the one or more remaining participants in the plurality of participants to be displayed on one or more graphical user interfaces of one or more computing devices of the one or more remaining participants, wherein a notification of the one or more notifications includes the portion of the transaction value.

2. The method of claim 1, wherein the transaction event is associated with another participant, the method further comprising:
   determining, based at least in part on the transaction data, another portion of the transaction value associated with the other participant; and
   generating and sending another notification to the other participant, the notification including the other portion of the transaction value.

3. The method of claim 2, wherein the portion of the transaction value is different from the other portion of the transaction value.

4. The method of claim 1, wherein the computing device is a client device.

5. The method of claim 1, wherein the plurality of participants includes a first participant and a second participant, and wherein the first participant pays for the portion of the transaction value using a type of payment method and the second participant pays for another portion of the transaction value using another type of payment method.

6. The method of claim 1 further comprising:
   receiving an authorization request message from a merchant computer;
   sending the authorization request message to an issuer computer;
   receiving an authorization response message from the issuer computer;
   sending the authorization response message to the merchant computer;
   receiving a request from the participant to establish a secure communications channel between an access device and the payment processing network; and
   establishing the secure communications channel between the access device and the payment processing network,
   wherein the transaction data for the transaction event is received subsequent to the secure communications channel being established between the access device and the payment processing network.

7. The method of claim 1 further comprising:
   receiving apportionment data indicating an allocation method for the transaction value, wherein the portion of the transaction value owed by a remaining participant in the plurality of participants is determined based at least in part on the apportionment data.

8. The method of claim 7, wherein the apportionment data is received from at least one of the plurality of participants.

9. The method of claim 1, further comprising:
   receiving apportionment data indicating a method in which the transaction value of the transaction event is to be apportioned across the participants of the transaction event; and
   computing, using the apportionment data, the portion of the transaction value owed by a remaining participant to the payer of the transaction event.

10. The method of claim 1, wherein the portion of the transaction value owed by the one or more remaining participants to the payer of the transaction event is determined after receiving the selection of the payer of the transaction event.

11. The method of claim 1 further comprising:
    receiving an indication that the portion of the transaction value owed by a remaining participant in the plurality of participants has been settled upon:
    receiving an indication that the portion of the transaction value owed by the remaining participant has been settled offline using cash;
    receiving an indication that the portion of the transaction value owed by the remaining participant has been written off or dismissed;
    receiving an indication that the portion of the transaction value owed by the remaining participant has been settled using a payment account associated with the remaining participant;

receiving an indication that the portion of the transaction value owed by the remaining participant has been settled via a third party online payment service; or receiving an indication that the portion of the transaction value owed by the remaining participant has been settled via a mobile app.

12. The method of claim 1, wherein the selection of the one of the plurality of participants to be payer of the transaction event is received prior to a processing of a payment of the transaction value.

13. A system comprising:
at least one processor; and
a computer readable medium coupled to the processor, wherein the computer readable medium comprises a set of instructions which when executed by the at least one processor causes the processor to:
present a graphical user interface associated with a collaboration service on a computing device for enrolling a user in the collaboration service;
enabling the user to enroll in the collaboration service associated with a collaboration server;
receive, by the computing device, transaction data for a transaction event associated with a plurality of participants, the transaction data including a transaction value associated with the plurality of participants;
receive, by the computing device, a selection of a participant in the plurality of participants to be a payer of the transaction event, wherein the transaction value of the transaction event is paid for by the selected payer of the transaction event;
determine, by the computing device, based at least in part on the transaction data, a portion of the transaction value owed by one or more remaining participants in the plurality of participants to the selected payer of the transaction event, the portion of the transaction value being less than the transaction value; and
cause the collaboration server to generate and send one or more notifications to the one or more remaining participants in the plurality of participants to be displayed on one or more graphical user interfaces of one or more computing devices of the one or more remaining participants, wherein a notification of the one or more notifications includes the portion of the transaction value.

14. The system of claim 13, wherein the transaction event is further associated with another participant, wherein the set of instructions further cause the processor to:
receive apportionment data from the other participant;
determine, based on the apportionment data, another portion of the transaction value associated with the other participant; and
cause another notification to be generated and sent to the other participant, the other notification including the other portion of the transaction value.

15. The system of claim 13, wherein the system includes a server computer, wherein the set of instructions further cause the processor to:
enable a remaining participant to pay the portion of the transaction value to the selected payer of the transaction event by permitting the remaining participant to select a personal account and facilitate a transfer of funds between the personal account and a funding account associated with the selected payer of the transaction event.

16. The system of claim 13, wherein the system includes a server computer, wherein the set of instructions further cause the processor to:
enable a remaining participant to pay the portion of the transaction value to the selected payer of the transaction event by providing access to a third-party payment processing system and facilitate a transfer of funds between the remaining participant and the selected payer of the transaction event.

17. The system of claim 13, wherein the system includes a server computer, wherein the set of instructions further cause the processor to:
register the participant with the collaboration service, wherein the participant registers with the collaboration service by logging onto a particular website and populating a form on the particular website or by activating a particular mobile application and providing information via an interface generated by the particular mobile application, wherein the participant is capable of managing the portion of the transaction value owed by another participant when the participant is registered to the service.

18. The system of claim 13, wherein receiving the transaction data for the transaction event comprises:
providing a list transactions to the participant; and
receiving a selection of a particular transaction from the list of transactions, wherein the list of transactions is provided by at least one of a payment processing organization associated with a payment card used to fund the transaction value of the transaction event, an issuer associated with a payment card used to fund the transaction value of the transaction event, or a third-party service provider.

19. A method comprising:
receiving, by a collaboration server computer, transaction data for a transaction event associated with a plurality of participants, the transaction data including a transaction value of the transaction event;
receiving, by the collaboration server computer, a selection of one of the plurality of participants to be payer of the transaction event, wherein the transaction value of the transaction event is paid for by the selected payer of the transaction event;
receiving, by the collaboration server computer, apportionment data associated with one or more participants in the plurality of participants, wherein a portion of the transaction value associated with the one or more participants is computed by an apportionment component based on the apportionment data, the portion of the transaction value being an amount owed by the one or more participants to the payer of the transaction event;
identifying, by the collaboration server computer and using a collaboration service database, one or more client devices associated with the one or more participants; and
causing a notification to be generated by the collaboration server computer and sent to the one or more client devices to be displayed on one or more graphical user interfaces of the one or more client devices, the notification including the portion of the transaction value.

20. The method of claim 19 further comprising:
sending the apportionment data to a server computer that computes the portion of the transaction value associated with the one or more participants.

21. The method of claim 19 further comprising:
receiving identification data identifying the plurality of participants, wherein receiving the identification data identifying the plurality of participants includes detecting a plurality of devices associated with the transaction event using at least one of a global positioning system (GPS) receiver, a wireless access point (WAP), a set of radio-frequency identifications (RFIDs), or near-field communications (NFC).

22. The method of claim 21, wherein the plurality of devices are detected to be associated with the transaction event when the plurality of devices are determined to be within a threshold distance of a computing device associated with the selected payer.

23. The method of claim 19 further comprising:
receiving an indication that a remaining participant has transferred the portion of the transaction value to the selected payer of the transaction event; and
indicating that the portion of the transaction value has been settled with the remaining participant.

24. A system comprising:
at least one processor; and
a computer readable medium coupled to the processor, wherein the computer readable medium comprises a set of instructions which when executed by the at least one processor causes the processor to:
receive, by a collaboration server computer, transaction data for a transaction event associated with a plurality of participants, the transaction data including a transaction value of the transaction event;
receive, by the collaboration server computer, a selection of one of the plurality of participants to be payer of the transaction event, wherein the transaction value of the transaction event is paid for by the selected payer of the transaction event;
receive, by the collaboration server computer, apportionment data associated with one or more participants in the plurality of participants, wherein a portion of the transaction value associated with the one or more participants is computed by an apportionment component based on the apportionment data, the portion of the transaction value being an amount owed by the one or more participants to the payer of the transaction event;
identify, by the collaboration server computer and using a collaboration service database, one or more client devices associated with the one or more participants; and
cause a notification to be generated by the collaboration server computer and sent to the one or more client devices to be displayed on one or more graphical user interfaces of the one or more client devices, the notification including the portion of the transaction value.

25. The system of claim 24, wherein the notification is in a form of at least one of an e-mail, an instant message, a text message, a voicemail, an alert, or a web-page.

26. The system of claim 24, wherein the set of instructions further cause the processor to:
receive identification data identifying the plurality of participants, wherein receiving the identification data identifying the plurality of participants includes accessing a social media network and receiving user selection of the plurality of participants via the social media network.

27. The system of claim 24, wherein the set of instructions further cause the processor to:
in response to not receiving an indication that the portion of the transaction value has been received from a remaining participant for a certain period of time, cause a reminder message to be generated and sent to the remaining participant.

* * * * *